(12) United States Patent
Childress et al.

(10) Patent No.: US 8,365,078 B2
(45) Date of Patent: *Jan. 29, 2013

(54) METHOD FOR MULTIDIMENSIONAL VISUAL CORRELATION OF SYSTEMS MANAGEMENT DATA

(75) Inventors: Rhonda L. Childress, Austin, TX (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 3279 days.

This patent is subject to a terminal disclaimer.

(21) Appl. No.: 10/753,250

(22) Filed: Jan. 8, 2004

(65) Prior Publication Data

US 2005/0198259 A1 Sep. 8, 2005

(51) Int. Cl.
*G06F 15/177* (2006.01)
*G06F 15/173* (2006.01)
*G06F 7/00* (2006.01)
*G01C 19/00* (2006.01)
*G01C 21/00* (2006.01)

(52) U.S. Cl. ....... 715/736; 321/165; 73/178 T; 709/224; 707/201

(58) Field of Classification Search .................. 715/736, 715/224; 709/224; 73/178 T; 379/165; 707/201
See application file for complete search history.

(56) References Cited

U.S. PATENT DOCUMENTS

| 5,430,833 | A | * | 7/1995 | Terenghi | 345/440 |
| 5,572,652 | A | | 11/1996 | Robusto et al. | |
| 5,819,028 | A | * | 10/1998 | Manghirmalani et al. | 714/57 |
| 5,819,033 | A | * | 10/1998 | Caccavale | 709/224 |
| 6,397,359 | B1 | | 5/2002 | Chandra et al. | |
| 6,728,219 | B1 | * | 4/2004 | Leong et al. | 370/252 |
| 7,082,463 | B1 | | 7/2006 | Bradley et al. | |
| 7,401,142 | B2 | * | 7/2008 | Childress et al. | 709/224 |
| 8,228,818 | B2 | * | 7/2012 | Chase et al. | 370/253 |
| 2004/0017403 | A1 | * | 1/2004 | Andersson et al. | 345/848 |

(Continued)

FOREIGN PATENT DOCUMENTS

EP 0764904 A1 3/1997
JP 58-223034 12/1983

(Continued)

OTHER PUBLICATIONS

Andoh et al., "Remote Workstation Monitoring Method and System", IBM Technical Disclosure Bulletin, vol. 41, No. 1, 1998 pp. 325-328.

(Continued)

*Primary Examiner* — Boris Pesin
*Assistant Examiner* — Ece Hur
(74) *Attorney, Agent, or Firm* — Yee & Associates, P.C.; Jeffrey S. LaBaw (57) ABSTRACT

A method, apparatus, and computer program product for monitoring the performance of a system. The mechanism of the present invention provides an interface in the form of a graphical user interface (GUI) to communicate multiple layers of system performance data to an operator. An operator monitors this display of information and uses it to determine how to adjust the system to optimize system performance. This mechanism of the present invention provides immediate feedback to an operator by displaying a trail of metric points, wherein the metric points indicate the status of system performance over a period of time. In this manner, the display mechanism of the present invention immediately conveys to an operator whether the system is operating within predefined margins, the results of performance adjustments made to the system, as well as predictions or trends for the system.

13 Claims, 4 Drawing Sheets

U.S. PATENT DOCUMENTS

| | | | |
|---|---|---|---|
| 2004/0111507 A1* | 6/2004 | Villado et al. | 709/224 |
| 2004/0257346 A1 | 12/2004 | Ong et al. | |
| 2005/0198576 A1* | 9/2005 | Childress et al. | 715/736 |

FOREIGN PATENT DOCUMENTS

| | | |
|---|---|---|
| JP | 04-109341 | 4/1992 |
| JP | 4152241 | 5/1992 |
| JP | 5216842 A | 8/1993 |
| JP | 7336736 A | 12/1995 |
| JP | 9054613 | 2/1997 |
| JP | 2002358396 | 12/2002 |
| JP | 2003157177 A | 5/2003 |

OTHER PUBLICATIONS

Childress et al., Method for Multidimensional Visual Correlation of Systems Management Data Displaying Orchestration Action Threshold, Jan. 8, 2004.

USPTO office action for U.S. Appl. No. 12/058,174 dated Jan. 25, 2010.

JPO office action dated Mar. 1, 2011.

USPTO Final Office Action for U.S. Appl. No. 12/058,174 dated Aug. 4, 2010.

Japan Office action dated Nov. 30, 2010.

Nagai, High Speed software for website display edition; PC fan; Mainichi Communications Inc., Jul. 1 2000, 7th vol. edition 12, pp. 200-205.

Shimonski et al., "Snifer Pro: Network Optimization & Troubleshooting Handbook", Syngress Publishing Inc. 2002, Available at Google Books: http://books.google.ca/books?id= 1WjJky OsKLwC& printsec=frontcover& dq=sniffer+ pro+ network+optimization+%26+troubleshooting+ handbook&hl=en& ei=G7tmTb-qLMTflgegk9mBAg&sa=X& oi=book_result& ct=result&resnum=1& ved=0CD8Q6AEwAA#v=onepage&q& f=false.

Canadian Patent Office action for application 2548795 dated Feb. 21, 2011.

* cited by examiner

METHOD FOR MULTIDIMENSIONAL VISUAL CORRELATION OF SYSTEMS MANAGEMENT DATA

CROSS REFERENCE TO RELATED APPLICATIONS

The present invention is related to the following application entitled "Method for Multidimensional Visual Correlation of Systems Management Data Displaying Orchestration Action Threshold", Ser. No. 10/753,545, filed on Jan. 8, 2004. The above related application is assigned to the same assignee, and incorporated herein by reference.

BACKGROUND OF THE INVENTION

1. Technical Field

The present invention relates to computer and data processing systems, and, more particularly, to the field of network computing. Even more particularly, the present invention relates to monitoring system performance and communicating detailed system performance data via an enhanced graphical user interface.

2. Description of Related Art

Computers have increasingly become a necessity of modern life, both for individuals as well as businesses. With the emergence of the Internet and with ever increasing competition in the marketplace, stand alone computers no longer provide the necessary services and capabilities users require. Many, if not most, companies need to share information between multiple groups, often located in different cities or even different countries. Networked computers provide for the transfer of information between computers, possibly dissimilar, joined together by means of gateways that handle data transfer and the conversion of messages from the sending computer to the protocols used by the receiving computer (with packets if necessary).

Consequently, networks have become cultural fixtures as sources of information have continued to enlarge and grow. However, as systems have continued to expand, their complexity has increased, making management of the networks difficult. For example, many companies employ networks that contain not several computers and devices, but hundreds of thousands of devices. Systems may comprise interrelated components, such as hardware, software, networks, data, connections, databases, processes, and procedures. Processes may use multiple technologies of disparate types. To manage these systems, an operator may monitor system performance in order to know where to update, configure, and adjust the system to increase customer satisfaction.

Current methods of monitoring and displaying system performance information consist of providing a static-type interface to an operator. The information is typically presented to the operator in a "stop light" or "speedometer" type of representation. However, these static interfaces merely provide a quick overview of the current status of the system. To obtain more detailed information regarding a potential problem, the operator must access reports or printouts containing the additional information.

Therefore, it would be advantageous to have a method, apparatus, and computer program product for providing an enhanced display for communicating system performance data, whereby multiple layers of system performance information may be communicated to an operator in a quick and efficient manner.

SUMMARY OF THE INVENTION

The present invention provides a method, apparatus, and computer program product for monitoring the performance of a system. The mechanism of the present invention provides an interface in the form of a graphical user interface (GUI) to communicate multiple layers of system performance data to an operator. An operator monitors this display of information and uses it to determine how to adjust the system to optimize system performance. This mechanism of the present invention provides immediate feedback to an operator by displaying a trail of metric points, wherein the metric points indicate the status of system performance over a period of time. In this manner, the display mechanism of the present invention immediately conveys to an operator whether the system is operating within predefined margins, the results of performance adjustments made to the system, as well as predictions or trends for the system. As a result, multiple layers of system performance information may be communicated to an operator in a quick and efficient manner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
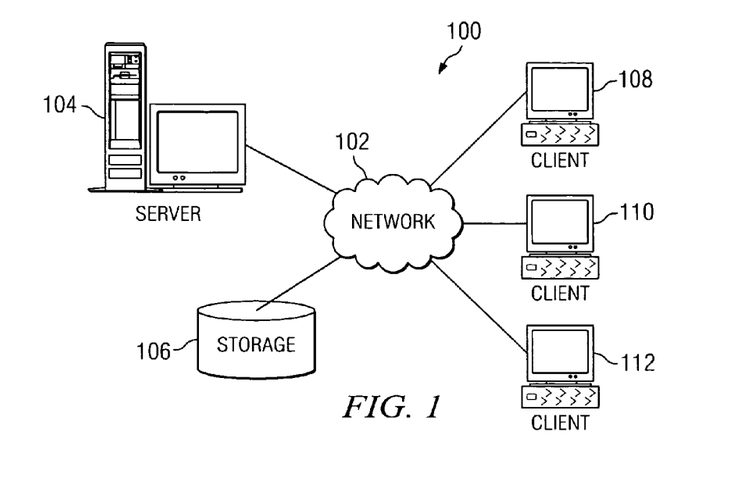
FIG. 1 is a representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers, transactional systems, or network computers. In the depicted example, server 104 provides data, such as boot files, operating system images, and applications to clients 108-112. Clients 108, 110, and 112 are clients to server 104, or application to application such as in transactional systems. Network data processing system 100 may include additional servers, clients, and other devices not shown. In the depicted example, network data processing system 100 is the Internet with network 102 representing a worldwide collection of networks and gateways that for example, use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present invention.

A system may span a single or multiple networks, such as for example, network data processing system 100. Also, a system may contain multiple client-server, client-to-client, and stand-alone data processing systems.

Figure 2:
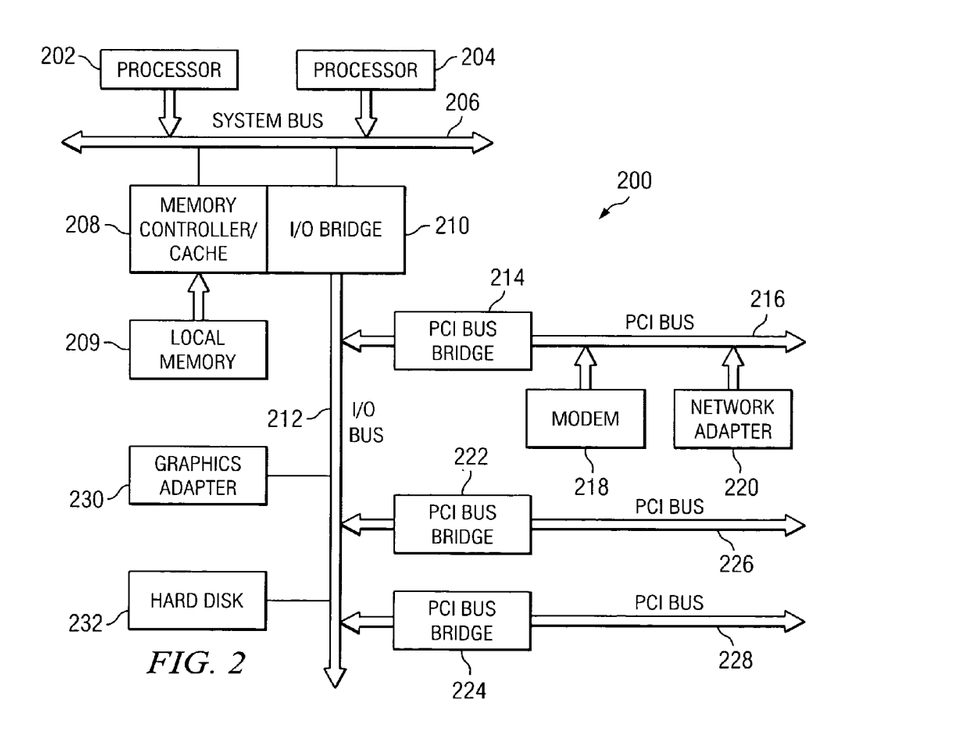
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 preferably includes a graphical user interface (GUI) that may be implemented by means of systems software residing in computer readable media in operation within data processing system 200. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
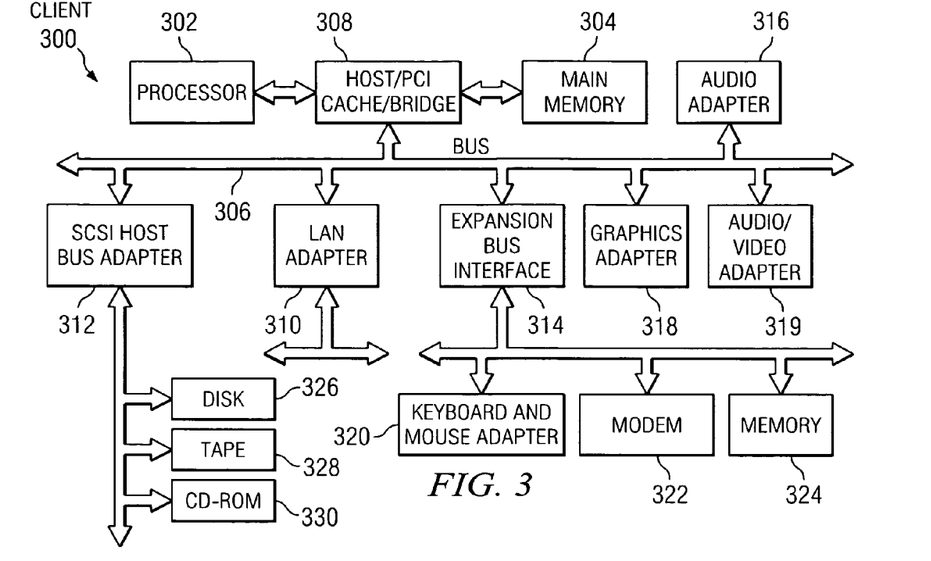
FIG. 3 is a block diagram of a data processing system in which the present invention may be implemented.

With reference now to FIG. 3, a block diagram illustrating a data processing system is depicted in which the present invention may be implemented. Data processing system 300 is an example of a client computer. Data processing system 300 preferably includes a graphical user interface (GUI) that may be implemented by means of systems software residing in computer readable media in operation within data processing system 300. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as "Windows XP", which is a trademark of Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. In a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA.

The present invention provides a method, apparatus, and instructions for monitoring system performance by providing an enhanced display of system performance data. This enhanced display provides a quick and efficient presentation of multiple layers of system performance information to an operator.

In known system management systems, performance data is displayed to operators using static representations of the system performance. Although current systems management interfaces provide a quick overview of the current status of a system, to obtain more detailed information regarding a potential problem, the operator must access reports or printouts containing this additional information.

For example, a typical systems performance data display uses a "stoplight" display for communicating system information to an operator. The stoplight consists of green, yellow, and red lights, wherein green indicates "satisfactory" performance, yellow indicates "improvement required", and red indicates "unacceptable" performance. These colored lights are used to indicate the current status of the system, and whether or not the system is working within set margins. For instance, if the stoplight for a particular performance indicator in the display is green, no action is required from the operator, since the green light indicates that system performance is within satisfactory boundaries for the particular indicator.

If the stoplight for a performance indicator in the display is yellow, there may be need for concern since the system is deviating from predefined target goals. Each change in the display is typically associated with an event or problem, as well as associated with a severity level and action to perform to remedy the event. The action to remedy the event may be automatically triggered, or the action may be made manually by the operator in order to get the system back on track in order to meet the target goals. Examples of possible actions include no action, warning messages, emails, or pages informing the operator of the event, and an automatic system response, such as initiating a program to remedy the event autonomically.

If the stoplight for a performance indicator is red, there may be a need for immediate action since the system has deviated from predefined target goals. Immediate adjustment is required, since the service provider may have to pay a penalty to the customer due to unacceptable performance.

However, the known stoplight representation as shown below in FIG. 4 merely conveys whether or not the system is operating within defined margins. If the operator wants to obtain more detailed information regarding a problem identified from the stoplight criterion, the operator must access a report or printout to obtain this additional information.

Figure 4:
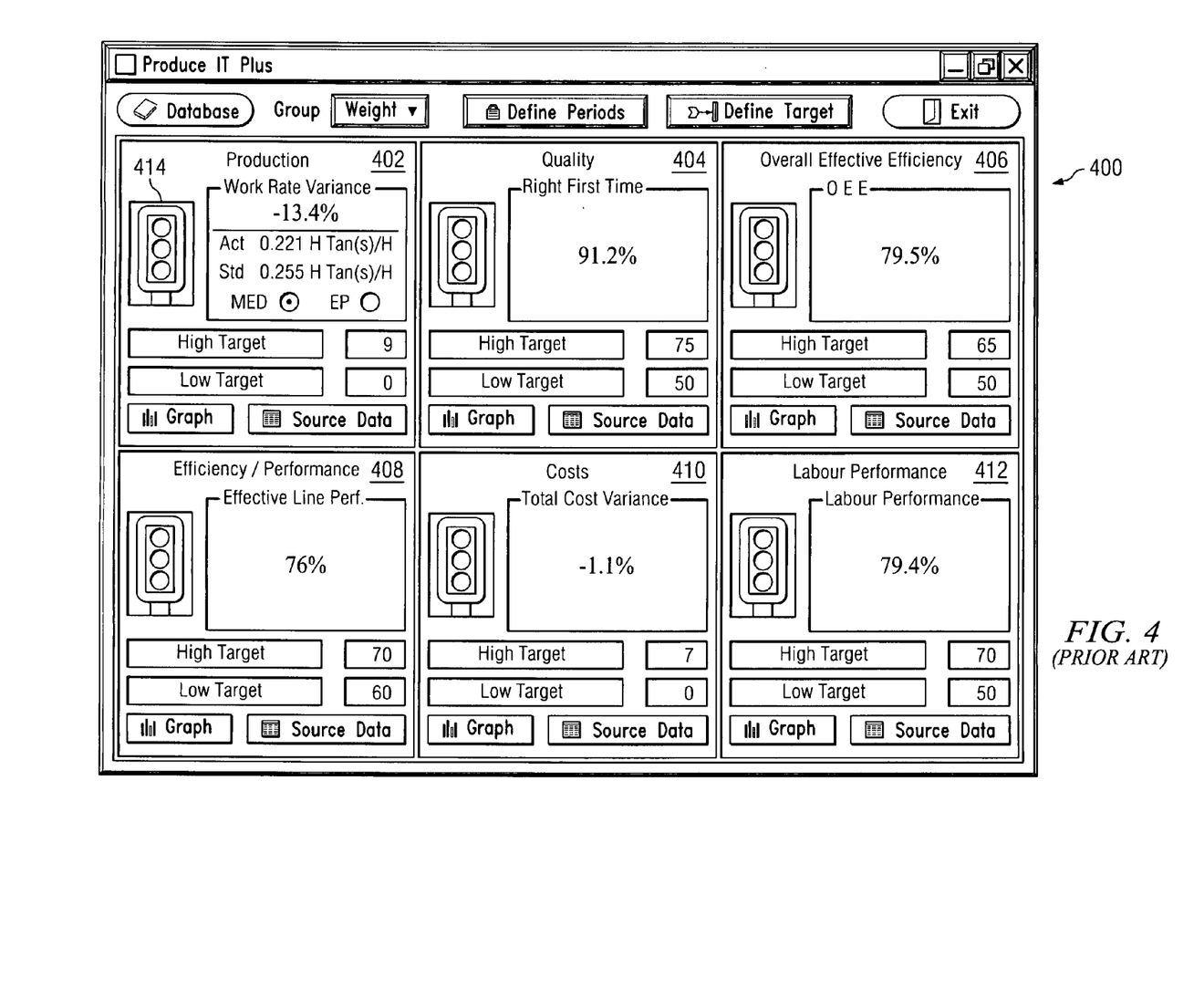
FIG. 4 is an illustration of a known systems management graphical user interface.

With reference now to FIG. 4, a block diagram of a known systems management graphical user interface is shown. In particular, FIG. 4 illustrates a graphical user interface of Produce Plus, a business performance management software product available from GOLEM Integrated Microelectronics Solutions GmbH, located in Vienna, Austria. Graphical user interface 400 may be implemented in data processing system 200 in FIG. 2 and/or data processing system 300 shown in FIG. 3. In this example interface, various systems performance information is displayed in graphical user interface 400.

Performance information may include performance indicators for assessment areas such as work production 402, quality 404, overall effective efficiency 406, performance/efficiency 408, costs 410, labor performance 412, and the like. Indicators are typically selected to focus on the most important assessment areas that an operator needs to optimize the system. The operator may view this performance information in the form of a "stoplight" representation, such as stoplight displays 414, to determine if there is a problem with system performance. If the operator has identified a problem, the operator may view corresponding reports and printouts containing more detailed information to determine adjustments to be made to system operation to correct the identified problem. The operator may determine how to adjust system operation by comparing detailed current systems information with previously defined target information.

As mentioned previously, the present invention provides a graphical user interface through which multiple layers of system performance information may be communicated to an operator. A display mechanism is provided that conveys a detailed representation of current system performance. This mechanism provides immediate feedback to an operator by displaying a trail of metric points, wherein the metric points indicate the status of system performance over a period of time. In this manner, the display mechanism of the present invention immediately conveys to an operator whether the system is operating within predefined margins, the results of performance adjustments made to the system, as well as predictions or trends for the system. As a result, multiple layers of system performance information may be communicated to an operator in a quick and efficient manner.

Figure 5:
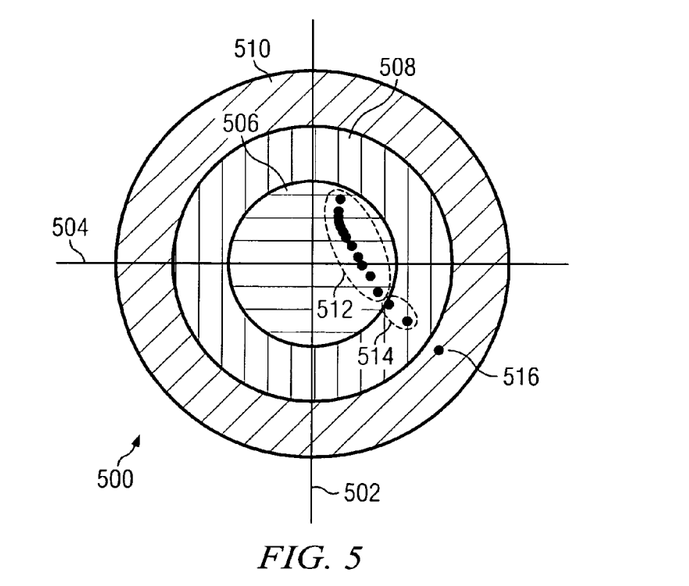
FIG. 5 is an exemplary diagram illustrating a graphical user interface for monitoring system performance according to a preferred embodiment of the present invention.

Turning next to FIG. 5, an exemplary diagram illustrating a graphical user interface for monitoring system performance is depicted in accordance with a preferred embodiment of the present invention. Graphical user interface 500 may be implemented in data processing system 200 in FIG. 2 and/or data processing system 300 shown in FIG. 3.

As shown in FIG. 5, a graphical user interface provides multiple layers of system performance data quickly and efficiently in the form of a target-type management vector display. Management vector display 500 is shown as a target representation, having a vertical and horizontal axis. Vertical 502 and horizontal axis 504 depict attributes set by the operator, such as, for example, database response time, server connect time, proxy connect time, number of requests/response headers delivered, and number of transactions per second. Industry baseline metrics may be used in setting the attributes. The ideal or target operational state of a monitored area of the system is the point where vertical 502 and horizontal 504 axis meet on management vector display 500.

Management vector display 500 also comprises three regions which indicate the status of system operation at a particular time. Each region may be depicted using a distinct color, such as green, yellow, and red. Region 506 may indicate "satisfactory" system performance, while region 508 may indicate "improvement required" and region 510 may indicate "unacceptable" system performance.

Region 506, or green region, contains the target operational state. The performance status of a particular area of the system at a particular time is indicated by a single dot or metric point on management vector display 500. When the metric point, such as metric points 512, is located within green region 506, the system is deemed to be working within acceptable margins of operation. No action is required by the operator in this situation.

If the metric point, such as metric points 514, is located within region 508, or yellow region, the system is determined to be outside of acceptable operation. Adjustments to the system operation may be recommended in order to steer system performance back into satisfactory margins of operation, and into green region 506. If the metric point, such as metric point 516, is located within red region 510, the system is determined to be outside of acceptable operation. Immediate adjustments to the system operation is required in this situation, since having system operation fall within red region 510 may result in a penalty for this "unacceptable" system performance.

Metric points 512, 514, 516 are used to indicate the current status of system performance at a particular time. As is shown in FIG. 5, metric points 512, 514, 516 depict a trail of status information determined at fixed periods of time. This trail of status information may be used to observe system performance trends. Management vector display 500 displays these trends in such a concise manner that many metrics may be simultaneously shown on management vector display 500, each metric having its own status trail, or history.

For example, each metric point in management display 500 may represent system performance status periodically determined every hour. In the first hour, system performance, as indicated by metric point 516, falls within red region 510. The operator may then make adjustments to the system operation in an attempt to move the state of the system from red region 510 towards the target operational state. Subsequent metric points determined at regular intervals, such as metric points 514 within yellow region 508, indicate that system performance has improved since metric point 516 was plotted. Metric points 514 show that although the status of system performance has improved, since metric points 514 still fall within yellow region 508, additional adjustments are still needed to move the state of the system into acceptable margins. Metric points 512, which fall within green region 506, illustrate the "acceptable" system performance over several fixed intervals of time.

Management vector display 500 also provides information regarding the results of performance adjustments made to the system. For example, metric points 512, 514, 516 also illustrate the state of the system over a period of time. The operator may use the metric trail to quickly view changes made to the system operation, as well as determine the effect these changes have on system performance.

As shown in FIG. 5, the closer a metric point is to the previous metric point, the slower the system changes over the fixed period of time. Conversely, the further apart a metric point is from the previous metric point, the faster the metric points change in value. For example, metric points 512 in green region 506 are closely spaced together. Although metric points 512 are indicated as having acceptable performance, the operator may make adjustments to the system operation in order to move the metric points closer towards the target operational state in the center of green region 506. The small effects of these adjustments made over a fixed period of time are conveyed via metric points 512, which show a slow rate of change since metric points 512 are plotted close together. In contrast, the distance between metric points 516 and 514 illustrates a large change in system performance over the same fixed period of time.

In some situations, as an operator adjusts system operation parameters to improve performance and move towards the target operational state, these adjustments may have some unintended consequence, such as drifting away from the target operational state. The mechanism of the present invention provides the operator with multiple layers of system performance data, including the current state of system performance, the results of previous performance adjustments, and a prediction/trend of future system performance in a quick and efficient manner.

Furthermore, vertical axis 502 and horizontal axis 504 are not necessarily to scale. Management vector display 500 may take any shape, including the round target form as shown in FIG. 5. In addition, the regions within management vector display 500, such as green region 506, yellow region 508, and red region 510, may be any size or shape. For example, it may be advantageous to have more space devoted to those regions having parameters where actions should be taken by the operator.

Although management vector display 500 is shown in FIG. 5 as a single system management display, management vector display 500 may be presented on a panel display together with additional management vector displays, each representing system performance and trends for a different set of variables. In this manner, the graphical user interface presented to an operator may comprise multiple target management vector displays on the same panel, each monitoring a different area of system performance.

Figure 6:
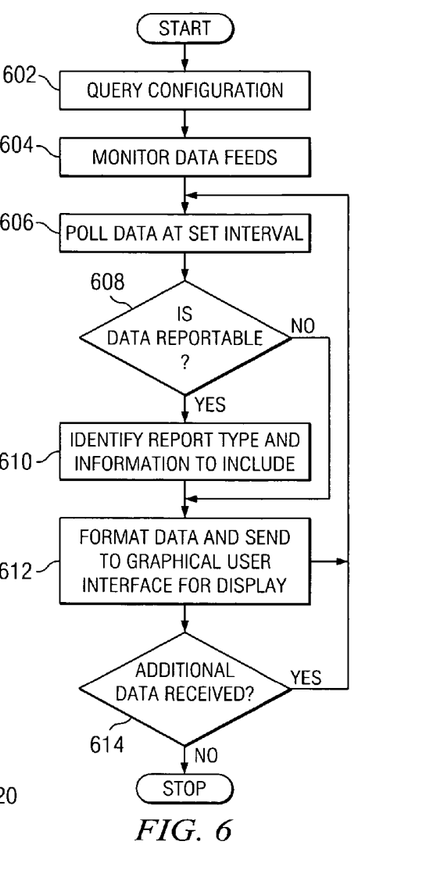
FIG. 6 is a flowchart of a process for presenting multiple layers of system performance data in accordance with a preferred embodiment of the present invention.

Turning now to FIG. 6, a flowchart of a process for presenting multiple layers of system performance data is shown in accordance with a preferred embodiment of the present invention. The process illustrated in FIG. 6 may be implemented in a data processing system, such as data processing system 200 in FIG. 2 and/or data processing system 300 shown in Figure.

The process begins by querying the current configuration for monitoring the system (step 602). The system configuration may be obtained from a BIOS call, a configuration file, or from a console or database. Configuration data may provide information such as which items to monitor, data polling intervals, location to send data, the threshold for an action, and which action to take. Next, system data is monitored using the instructions obtained from the BIOS call, configuration file, console, or database (step 604). System data may then be polled at set intervals according to the system configuration (step 606) or alternatively system data may be sent as events. A determination is then made as to whether the retrieved data is reportable (step 608). Whether data is reportable may depend on a number of criteria, such as, for example, if the data is a duplicate or if the user configuration indicates that the user is uninterested in the data, the data is not reportable and should be discarded. If the data is reportable, a determination is made as to which report to use to convey the data, and which information to include in the report (step 610). Turning back to step 608, if the data is not reportable, the process proceeds directly to step 612, wherein the data is formatted and sent for display on the graphical user interface. An alert may be raised if the data I nearing or crossing one of the displayed thresholds. Each of the previously represented data points are then de-emphasized using either color or intensity, the oldest point being de-emphasized the greatest. The number of previous representations maintained and "faded" depends upon the configuration of the display and the frequency of the updated data point. For more frequently updated data points, fewer points should be displayed to prevent clutter and enhance the understandability of the trending direction of the data points. A determination is then made as to whether additional data is received (step 614). If additional data is received, the process loops back to step 606. If no additional data is received, the process terminates.

The mechanism of the present invention may also be enhanced to include additional system management parameters to the operator. These parameters include boundaries derived from a service level agreement (SLA) and an orchestration action threshold. A service level agreement is an informal contract between a service provider and a customer that defines the terms of the service provider's responsibility to the customer. The service level agreement also includes the type and extent of remuneration if those responsibilities are not met. Orchestration defines a set of rules for a process flow, wherein processes are executed according to these defined rules in order to achieve a common goal between participants in the process. These rules may be used by the system to "orchestrate the response" to changes in the system.

Figure 7:
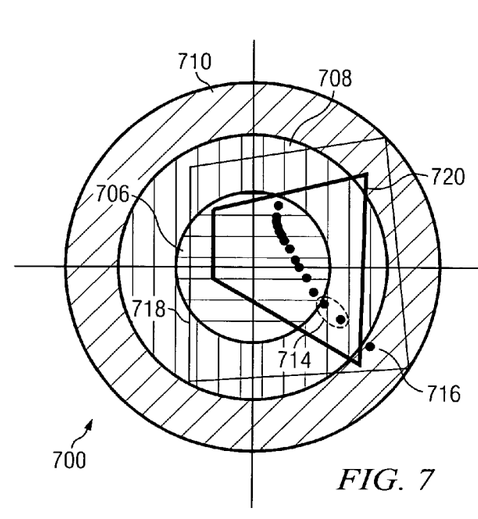
FIG. 7 is an exemplary diagram illustrating a graphical user interface for displaying acceptable parameters of system operation based on service level agreements and/or orchestration action thresholds in accordance with a preferred embodiment of the present invention.

Turning now to FIG. 7, an exemplary diagram illustrating a graphical user interface for displaying acceptable parameters of system operation based on service level agreements and/or orchestration action thresholds is depicted in accordance with a preferred embodiment of the present invention. Graphical user interface 700 may be implemented in data processing system 200 in FIG. 2 and/or data processing system 300 shown in FIG. 3.

As shown in FIG. 7, a graphical user interface provides additional layers of system management data, including service level agreements and/or orchestration action thresholds. Service level agreements and/or orchestration action thresholds are defined in management vector display 700. As also described in FIG. 5, management vector display 700 comprises three regions that indicate the status of system operation at a particular time. Each region may be depicted using a distinct color, such as green, yellow, and red. Region 706 may indicate "satisfactory" system performance, while region 708 may indicate "improvement required" and region 710 may indicate "unacceptable" system performance.

SLA boundary 718, presented within management vector display 700, represents the metric boundary of a service level agreement at the current time. Although SLA boundary 718 is shown in a particular location on management vector display 700, SLA boundary 718 may change according to according to predefined time periods. For example, an operator may monitor the load on a CPU and response time using a service level agreement as represented by SLA boundary 718. As CPU load and response time may vary according to customer usage, the boundaries of a service level agreement may be altered according to predefined time periods. For instance, the boundaries of a service level agreement during an anticipated period of heavy customer usage, such as during a typical work day, may be different than the boundaries set for an anticipated period of light customer usage, such as around 12 o'clock midnight.

As mentioned previously, the performance status of a particular area of the system at a particular time is indicated by a single dot or metric point, such as metric point 716. SLA boundary 718, representing the metric boundary of the service level agreement at the current time, allows the operator to monitor and measure service level performance. As a metric point, such as metric point 716, is plotted on management vector display 700, the operator may determine whether system performance is in adherence with the service level agreement. If the metric point is plotted outside of SLA boundary 718, the system is not performing within defined parameters of operation. As a result, the operator must make adjustments to system operation to get the system back on track in order to adhere to the parameters of operation defined in the service level agreement. A penalty for not meeting the parameters of the agreement may also have to be paid due to the unacceptable performance.

If the metric point is plotted within SLA boundary 718, the system is performing within defined parameters of operation at the current time, and no penalty will result. For example, metric point 716 is plotted within red region 710. Typically, if system performance falls within red region 710, the operator will determine that current system performance is unacceptable and a penalty will result. However, using the additional layer of system information in SLA boundary 718, the operator may determine that, although metric point 716 falls within red region 710, system performance is still within acceptable limits, since metric point 716 is plotted within the current service level agreement boundary 700. Thus, even though system performance appears to be unacceptable from the plotting of metric point 716 in red region 710, the operator may quickly and efficiently determine that system performance is within acceptable limits according to the parameters in the service level agreement.

Orchestration action boundary 720, presented within management vector display 700, represents the metric boundary of an orchestration action threshold boundary at the current time. Although orchestration action boundary 720 is shown in a particular location on management vector display 700, orchestration action boundary 720 may change according to the demand on system resources. Orchestration allows users to manipulate their IT environment in real time, according to defined policies, to achieve desired goals. Orchestration "senses" an increase in the demand for resources and automatically takes action to reallocate those resources accordingly, and provisions them throughout the entire system. Thus, the system "orchestrates" the activities necessary to automatically meet required service levels.

Orchestration boundary 720 defines whether an automatic workflow correction will be invoked to adjust system performance, or whether a manual correction is required. For example, when metric point 716 is plotted on management vector display 700, the operator may determine that immediate adjustment is required since metric point falls within "unacceptable" red region 710. However, since metric point 716 also falls outside of orchestration boundary 720, the adjustment to the system will be made automatically, without operator intervention. A workflow correction is automatically invoked to reallocate system resources accordingly.

In contrast, when metric point 714 is plotted on management vector display 700, the operator may determine that an adjustment should be made since metric point falls within "improvement required" yellow region 708. However, since metric point 714 also falls within orchestration boundary 720, the operator must manually make the necessary adjustments to the system to improve system performance. Thus, as orchestration allows the system to autonomically correct itself, orchestration boundary 720 provides an operator with an additional layer of quick and efficient feedback regarding system performance.

Figure 8:
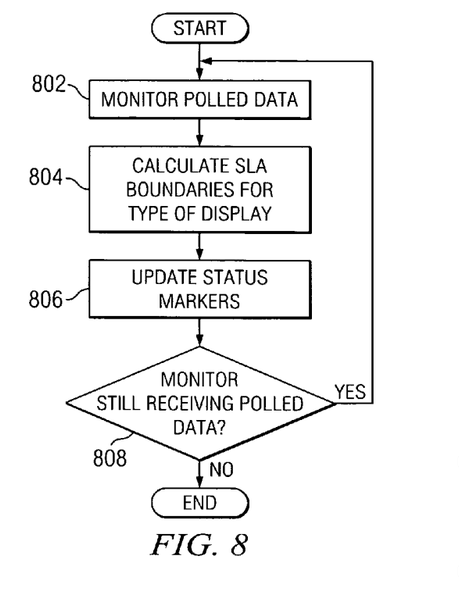
FIG. 8 is a flowchart of a process for displaying acceptable parameters of system operation based on service level agreements and/or orchestration action thresholds in accordance with a preferred embodiment of the present invention.

Turning now to FIG. 8, a flowchart of a process for displaying acceptable parameters of system operation based on service level agreements and/or orchestration action thresholds is shown in accordance with a preferred embodiment of the present invention. The process illustrated in FIG. 8 may be implemented in a data processing system, such as data processing system 200 in FIG. 2 and/or data processing system 300 shown in Figure.

The process begins by using a real time monitoring agent to monitor the polled data (step 802). System performance data may be obtained by polling system data, such as polled data obtained in step 606 in FIG. 6, although other methods of obtaining system performance data may be used. The poll monitor may be a push or pull monitor (i.e., polling or messaging). The polled data may include information such as the response time data from the server. Referring to the terms and rules in the SLA data, the polled data may be averaged if the number of transactions is high and the transactions are legal under the SLA terms, or the polled data may be used as a best case/worst case scenario. Next, the SLA boundaries for the type of display graphic (e.g., server response time) are calculated (step 804). The SLA boundaries may be calculated using the contractual data (rules) in the SLA agreement. The contractual data in the SLA agreement may be stored as XML (extensible markup language), for example, and may be a standard XML, such as OASIS (Organization for the Advancement of Structured Information Standards) ebXML. The status markers indicating system performance are then updated based on the current status (step 806). For example, the status markers may be updated like a fading of a radar return, although other updating schemes are possible to indicate the current status of the system, such as using colors fading using a rainbow scale. In the radar return example, the current system performance marker may be highlighted, while the other previous markers are faded by at least one increment. A determination is then made as to whether real time monitor is still receiving polled data (step 808). If so, the process loops back to step 802 and the process continues. Turning back to step 808, if is it determined that real time monitor is no longer receiving polled data, then the process terminates.

Thus, the present invention provides an improved method, apparatus, and computer instructions for monitoring system performance and communicating detailed system performance data via an enhanced graphical user interface. The mechanism of the present invention may assist system operators in monitoring and managing the performance of the system, which ultimately may result in more satisfied customers. The mechanism of the present invention provides an interface in the form of a graphical user interface (GUI) to communicate multiple layers of system performance data to an operator. An operator monitors this display of information and uses it to determine how to adjust the system to optimize system performance.

The present invention offers advantages over the known systems management systems since current methods of monitoring and displaying system performance information consist of providing a static-type interface to an operator. Known system performance displays, such as the "stoplight" representation, are static, and merely provide a quick overview of the current status of a system. The present invention improves upon current systems management displays by providing an enhanced graphical user interface for communicating system performance data, whereby multiple layers of system performance information may be communicated to an operator in a quick and efficient manner.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring system performance and communicating detailed system performance data via an enhanced graphical user interface, comprising:
   querying a current monitoring configuration;
   monitoring system performance using instructions obtained from the current monitoring configuration;
   polling system data according to the current monitoring configuration;
   displaying the polled system data on a graphical user interface, wherein the graphical user interface comprises a target-type management vector display including regions representing levels of system performance and a metric point within the display identifying the current status of system performance at a particular point in time; and
   performing an adjustment to system operations based on a region in which the metric point is located in the target-type management vector display to move system performance towards a target operational state represented by a point where the vertical axis and horizontal axis meet on the management vector display.

2. The method of claim 1, further comprising:
   determining whether the polled system data is reportable;
   selecting a report to display the polled system data; and
   identifying information in the polled system data to display in the report.

3. The method of claim 1, wherein the metric point within the target-type management vector display provides the performance status of a particular area of the system at a particular time.

4. The method of claim 1, wherein multiple metric points are used in the display to identify a trail of system status information determined at fixed periods of time.

5. The method of claim 4, wherein the metric trail is used to determine the effect adjustments to system operation have on system performance.

6. The method of claim 4, wherein the distance between consecutive metric points indicates the rate of change of system performance over a fixed period of time.

7. The method of claim 1, wherein the target-type management vector display includes a vertical axis and horizontal axis representing user-defined attributes.

8. The method of claim 7, wherein the user-defined attributes include transactions over time.

9. The method of claim 7, wherein industry baseline metrics are used to set the attributes.

10. The method of claim 1, wherein the target-type management vector display comprises three regions, wherein a first region indicates satisfactory performance, a second region indicates improvement required performance, and a third region indicates unacceptable performance.

11. The method of claim 1, wherein the regions are displayed using different colors.

12. The method of claim 1, wherein the graphical user interface includes multiple target-type management vector displays, each display representing system performance for a different set of variables.

13. The method of claim 1, further comprising:
   updating the target-type management vector display to include a new metric point identifying an updated status of system performance as a result of the adjustment to the system operation.

* * * * *